United States Patent [19]

Perper

[11] Patent Number: 4,941,771

[45] Date of Patent: Jul. 17, 1990

[54] HYDROELECTRIC PLANT

[76] Inventor: Robert Perper, R.D. #2, Hillsdale, N.Y. 12529

[21] Appl. No.: 403,617

[22] Filed: Sep. 6, 1989

[51] Int. Cl.⁵ ............................................. E02B 9/00
[52] U.S. Cl. ..................................... 405/78; 137/386; 405/75
[58] Field of Search ...................... 405/75–78, 405/92, 96, 36, 37, 39; 60/398; 290/53, 42, 43, 54; 137/386

[56] References Cited

U.S. PATENT DOCUMENTS

| | | |
|---|---|---|
| 1,813,107 | 7/1931 | Allner . |
| 2,163,102 | 6/1939 | Odill ........................................ 405/78 |
| 3,354,655 | 11/1967 | Armond ................................. 405/96 |
| 4,227,266 | 10/1980 | Russell . |
| 4,324,506 | 4/1982 | Steinke ................................... 405/96 |
| 4,464,079 | 8/1984 | Chance .................................. 405/37 |
| 4,464,080 | 8/1984 | Gorlov ................................. 60/398 X |
| 4,478,534 | 10/1984 | McIlwain ........................... 405/92 X |
| 4,498,809 | 2/1985 | Farmer ................................ 137/386 |
| 4,569,200 | 2/1986 | Lamb ................................. 405/78 X |
| 4,621,945 | 11/1986 | Schafer et al. . |
| 4,772,157 | 9/1988 | Obermeyer . |

*Primary Examiner*—Dennis L. Taylor
*Attorney, Agent, or Firm*—Schmeiser, Morelle & Watts

[57] ABSTRACT

A hydroelectric system is disclosed which is designed to run intermittently to compensate for a low flow source. A float system is employed to control the operating points of the turbine by opening an inlet valve at one predetermined pond level and closing the inlet valve at a lower predetermined level. A novel entrance to the turbine inlet pipe is also disclosed which eliminates problem turbulence when the pond level is near the lower predetermined limit.

8 Claims, 2 Drawing Sheets

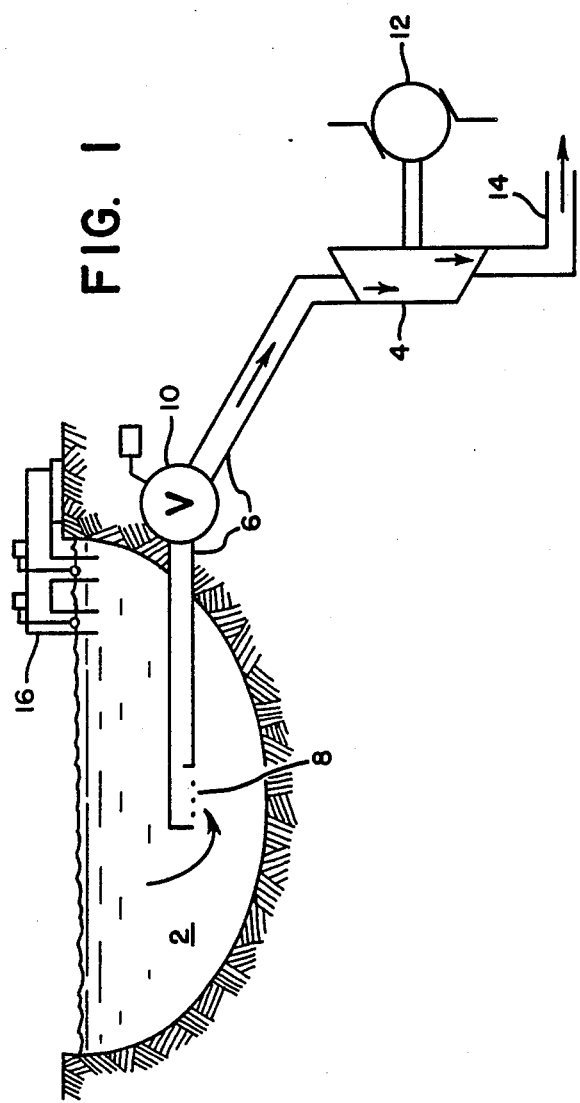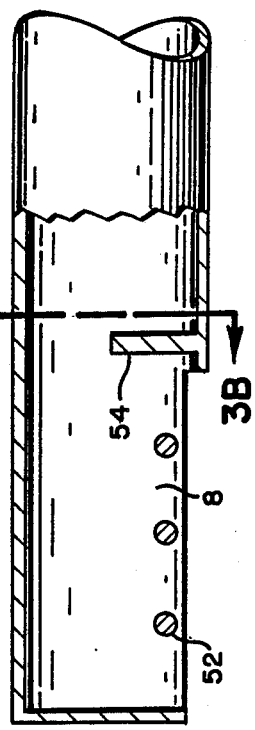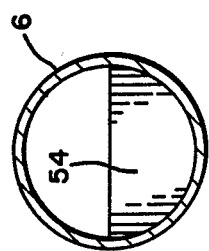

HYDROELECTRIC PLANT

FIELD OF THE INVENTION

The instant invention is in the field of power generation systems. More particularly, to a hydro-electric power generation system in which the turbine is driven intermittently.

BACKGROUND OF THE INVENTION

In a hydroplant, the energy available is dependent on the water flow rate and the available pressure head. The head is the difference in height between the level of the body of water that feeds the turbine and the level of the turbine's outlet point. Normally, a dam is placed on a stream to increase the height of the body of water and also to build up the storage capacity of the body. In this way, the hydroplant can run practically continuously with stoppages only for drought or flooding conditions or for equipment maintenance/repair.

One normally sizes the turbine for continual operation, i.e. a small pond/stream will drive a small turbine. For very small streams, there has not been any practical method for harnessing the available energy since the flow rate of the stream cannot build up a pond that can provide continuous operation of commercially available hydroplants.

SUMMARY OF THE INVENTION

The inventor has designed a unique hydroelectric system which can run intermittently using commonly available hydroplants. In this system, a low flow stream that has been dammed is used to create a small pond. A float system is placed into the pond for sensing the water level.

A turbine having a water inlet and water outlet is placed near the pond. When the pond reaches an upper predetermined level, the float system sends a signal to a valve in the turbine inlet. The valve fully opens and the turbine runs until the pond is drained to a lower predetermined level at which time the float system causes the above mentioned inlet valve to close.

By this method, the hydroplant is run at its full capacity when sufficient water accumulates. The hydroplant can then be used to charge batteries, run equipment, and as a main energy source during a rainy season. The hydroplant also can be used for selling energy to an electric utility.

Another aspect of the invention lies in a unique design for the entrance to the turbine's water inlet. Since the pond level is continuously changing, a water inlet that prevents turbulence and associated whirlpools is required. The inlet conditions could affect the pond bottom and thereby increase the sediments in the water. The inventor has designed a downwardly facing entrance with an interior baffle to accomplish a smooth water flow without affecting the pond bottom.

BRIEF DESCRIPTION OF THE DRAWINGS

FIG. 1 shws a schematic view of the hydroelectric system.

FIG. 3A shows a cross-sectional view of the turbine inlet entrance.

FIG. 3B is an elevation view of FIG. 3A showing the baffle plate.

DESCRIPTION OF THE PREFERRED EMBODIMENT

Figure 2:
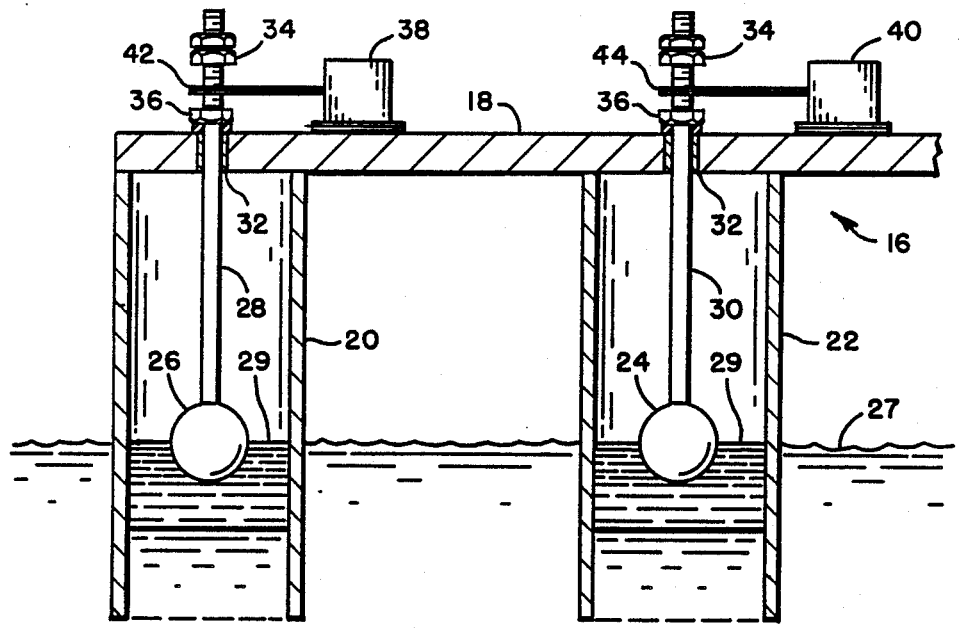
FIG. 2 shows a cross-sectional view of the float system.

FIG. 1 shows a schematic view of a hydroplant of the instant invention. A pond 2 supplies water to a turbine 4 via a water inlet 6. At the end of the inlet is entrance 8. Located in the inlet is a motor operated valvel 10. Operatively attached to the turbine is an electrical generator 12 which can supply electricity to batteries, equipment, etc. Water leaves the turbine through outlet 14 which typically discharges to a continuation of the stream which was dammed to make the pond. As shown, the turbine and generator are normally located below the pond. Not shown, there is an emergency flume for directing pond overflow around the hydroplant and down to the stream proximate the outlet.

Shown mounted in the pond is a float valve system 16 for sensing the pond level and for controlling valve 10 accordingly.

FIG. 2 shows a detailed view of the float valve system 16. A foundation 18 is mounted near one of the pond banks. Attached to the foundation are containers 20 and 22 which house floats 24 and 26. The containers are partially immersed in the pond. The surface of the pond is labeled 27. Within each container is an amount of oil 29. The oil floats on the top of the water and its surface approximates the same level as that of the pond surface. Floating in the oil are the floats 24 and 26. Variations in the pond level are duplicated within the containers and affect the heights of the floats. The oil is used to prevent freezing of the float system and also to accurately measure the liquid height of the pond even when there is a layer of ice on the pond surface.

Attached to the floats 24 and 26 are threaded rods 28 and 30. The rods extend through holes 32 in the foundation. Spacedly mounted on each rod are a pair of double lock nuts 34 and 36. Each of the double lock nuts are located on the rods at locations which coincide with predetermined pond levels, as will be further described later.

Switches 38 and 40 are also mounted on the foundation. The two switches each have an activation tab, 42 and 44 which extends from the switch to a point within the outer diameter of the lock nuts. When the pond rises to a predetermined level, the lower double lock nuts contact the tabs and activate the switches. When the pond level falls to a predetermined level, the upper double locknuts contact the tabs and again, the switches are activated.

FIG. 3A is a cross-sectional view of the entrance to the turbine water inlet. The inlet pipe 6 has an entrance 8 which faces away from the pond surface (as can be seen in FIG. 1). At the opening, there is a trash rack 52 which is in the form of a screen or a series of bars which prevents large matter from entering the pipe. Perpendicular to the bottom of the pipe and spaced from the opening is a baffle 54. The baffle is in the form of a half-circle, as seen in FIG. 3B, and effectively seals off the bottom half of the pipe at the baffle location. The combination of a down-turned opening and the baffle reduces turbulence and prevents whirlpools in the pond in the area of the entrance. In addition, the top of the baffle is the lowest point the pond can drain to if the valve 10 fails to shut and water flows out through the turbine. This prevents surface materials from reaching the inlet and clogging the turbine if the above noted drain-down situation should occur.

Figure 4:
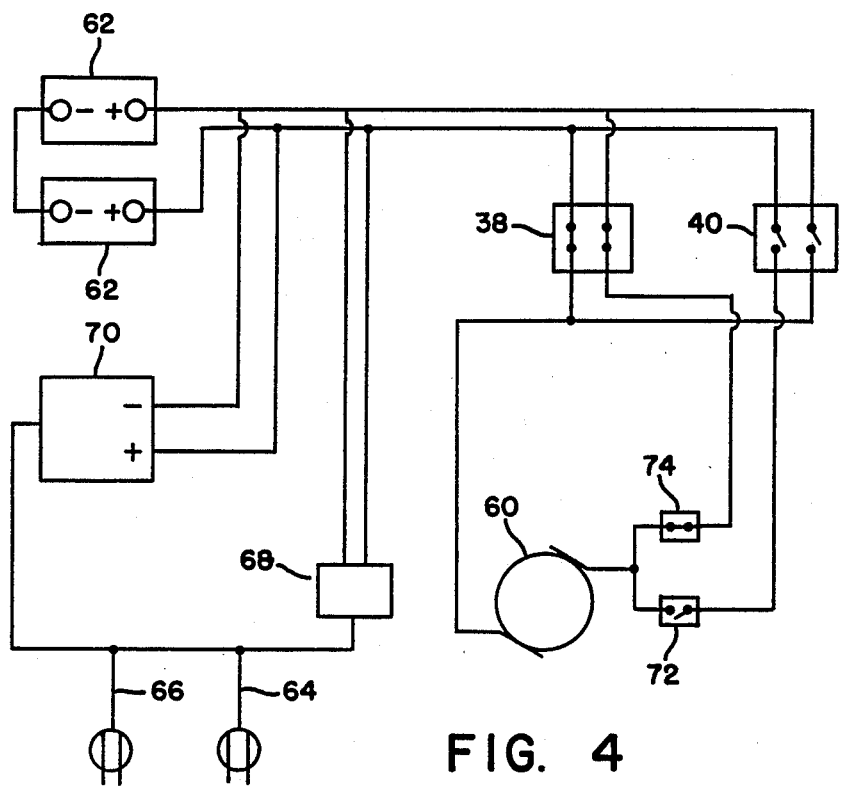
FIG. 4 shows a typical wiring diagram for a hydroelectric system of the instant invention.

FIG. 4 shows a wiring diagram for a hydroelectric system in accordance with the preferred embodiment of the invention. The power sources to operate the motor 60 of the motor operated valve 10 are a pair of batteries 62 or a commercial 110 volt power line 64. A power line 66 coming from the generator 12 is also available as a power source. The power sources other than the batteries are converted to 24 volt D.C. through a relay and power converter 68. These latter sources can also be used to charge the batteries through a 24 V.D.C. battery charger 70. The diagram shows switch 38 in an "on" position and switch 40 in an "off" position. The motor operator includes two limit switches 72 and 74. One limit switch is activated when the valve reaches a fully open position and the other limit switch is activated when the valve reaches a fully closed position.

The operation of the system will now be detailed.

A stream slowly fills the pond. As the pond level rises, the oil in the containers 20 and 22 also rises, as do the floats and their attached rods. When the pond rises to a predetermined level, the lower double locknuts 36 activate switch 38 to an "on" position and switch 40 to an "off" position (shown in FIG. 4). At this point, power is supplied to the valve motor 60 to cause the valve to open. When the valve reaches its fully open position, limit switch 72 is activated to its "on" position and limit switch 74 is activated to its "off" position, thereby turning off the power to the valve motor. At this point, water is allowed to flow through the water inlet and down to the turbine. The flowing water turns the turbine and the turbine causes the generator to spin and generate electricity. The water flows out of the turbine through the water outlet, and into the stream.

When the pond drains to a lower predetermined level, the upper double locknuts 34 activate switch 38 to an "off" position and switch 40 to an "on" position. This allows power of an opposite polarity to reach the valve motor. This causes the motor to turn in an opposite direction thereby causing the valve to close. When the valve reaches the fully closed position, limit switch 74 is activated to an "on" position and limit switch 72 is activated to an "off" position. This turns off powder to the valve motor. At this point, water flow to the turbine is discontinued and the turbine stops. Operation of the turbine will again commence when the pond refills.

The embodiment and procedures disclosed herein have been discussed for the purpose of familiarizing the reader with the novel aspects of the invention. Although a preferred embodiment of the invention has been shown and described, many changes, modifications and substitutions may be made by one having ordinary skill in the art without necessarily departing from the spirit and scope of the invention.

I claim:

1. A hydroelectric system comprising:
a water-powered turbine having a water inlet and a water outlet,
an electrical generator operatively connected to said turbine,
a float valve system comprising a level sensing means for sensing the water level in a body of water which feeds the water inlet, and a flow control means mounted in said water inlet and operatively connected to said level sensing means for controlling the flow of water through the water inlet, whereby said level sensing means comprises a float means movably mounted on a foundation and located to rise and fall with the level of said body of water, an electrical switch means operatively connected to said float means and to said flow control means whereby when the level of the body of water rises to a predetermined height, the float means activates the switch means and the switch means sends a signal to the flow control means which causes it to allow water to flow to the turbine by fully opening and staying open until the level of the body of water falls to a predetermined level at which point the float means again activates the switch means which causes the flow control means to fully close thereby stopping the water flow to the turbine.

2. The system of claim 1 wherein said float means comprises a first and second float each mounted on a separate shaft which is capable of moving with said float as the level of said body of water changes, said shafts being operatively connected to said switch means to activate the switch means when the level of the body of water is at said predetermined levels.

3. The system of claim 2 wherein said shaft includes an activation means for said activation of said switch means, said activation means being adjustably mounted on said shaft for changing the predetermined levels at which the switch means are activated.

4. The system of claim 1 wherein the float means are surrounded by a fluid containment means, said containment means being placed in said body of water and mounted to said foundation, said containment means extending above the upper predetermined level of the body of water and extending into the body of water below the lower predetermined level of the body of water, said containment means being open at the bottom and at least partially filled with a fluid that has a lower freezing point than water, whereby as the level of water in said body of water rises, said lower freezing point fluid also rises in said containment means thereby raising said float means.

5. The system of claim 4 wherein said lower freezing point fluid is oil.

6. The system of claim 2 in which the flow control means is caused to open when one of said floats closes a first switch and is caused to open when the other of said floats closes a second switch.

7. The system of claim 1 wherein said water inlet comprises a water entrance means at one end, said water entrance means comprising a water inlet opening that faces away from the surface of the body of water, a trash rack mounted on said entrance means for preventing trash from entering said water inlet, and a baffle mounted within said inlet and extending upwardly from a bottom portion of said water inlet.

8. A hydro-electric system comprising:
a water powered turbine having a water inlet and a water outlet,
an electrical generator operatively connected to said turbine,
a float valve system comprising a level sensing means for sensing the water level in a body of water which feeds the water inlet, and a flow control means mounted in said water inlet and operatively connected to said level sensing means for controlling the flow of water through the water inlet,
said level sensing means comprising a float means movably mounted on a foundation and located to rise and fall with the level of said body of water, an electrical switch means operatively connected to said float means and to said flow control means whereby when the level of the body of water rises to a predetermined height, the float means activates the switch means and the switch means sends a signal to the flow control means which causes it to allow water to flow to the turbine by fully opening and staying open until the level of the body of water falls to a predetermined level at which point the float means again activates the switch means which causes the flow control means to fully close thereby stopping the water flow to the turbine and, wherein said water inlet comprises a water entrance means at one end, said water entrance means comprising a water inlet opening that faces away from the surface of the body of water, a trash rack operatively mounted to said opening for preventing trash from entering said water inlet and a baffle mounted within said inlet and extending upwardly from a bottom portion of said water inlet.

* * * * *